United States Patent
Nozawa et al.

(10) Patent No.: US 8,928,870 B2
(45) Date of Patent: Jan. 6, 2015

(54) LENS METER

(75) Inventors: Noritsugu Nozawa, Toyokawa (JP); Hikaru Miyabayashi, Toyohashi (JP)

(73) Assignee: Nidek Co., Ltd., Gamagori (JP)

( * ) Notice: Subject to any disclaimer, the term of this patent is extended or adjusted under 35 U.S.C. 154(b) by 612 days.

(21) Appl. No.: 13/226,875

(22) Filed: Sep. 7, 2011

(65) Prior Publication Data

US 2012/0081697 A1 Apr. 5, 2012

(30) Foreign Application Priority Data

Sep. 30, 2010 (JP) ................................. 2010-222134

(51) Int. Cl.
| | | |
|---|---|---|
| *G01B 9/00* | (2006.01) | |
| *A61B 3/00* | (2006.01) | |
| *A61B 3/10* | (2006.01) | |
| *G01B 1/00* | (2006.01) | |
| *G01M 11/02* | (2006.01) | |

(52) U.S. Cl.
CPC ...... *G01M 11/0214* (2013.01); *G01M 11/0235* (2013.01)
USPC ........... 356/124; 356/125; 356/126; 356/127; 351/200; 33/200; 33/507

(58) Field of Classification Search
CPC ................... G01M 11/0235; G01M 11/02147; G03F 7/70591; G03F 7/7085; G03F 7/70775; G03F 7/70825
USPC ............. 356/124–127; 351/200; 33/200, 507
See application file for complete search history.

(56) References Cited

U.S. PATENT DOCUMENTS

| | | | |
|---|---|---|---|
| 4,571,842 A | | 2/1986 | Ikezawa et al. |
| 4,676,004 A | * | 6/1987 | Nakamura et al. .............. 33/507 |
| 5,844,671 A | * | 12/1998 | Kajino et al. .................. 356/124 |
| 5,971,537 A | | 10/1999 | Fukuma et al. |
| 2006/0001862 A1 | * | 1/2006 | Fukuma et al. ............... 356/124 |

FOREIGN PATENT DOCUMENTS

JP   A-2006-292650   10/2006

OTHER PUBLICATIONS

Search Report issued in European Application No. 11181009.9 dated Dec. 19, 2011.

* cited by examiner

*Primary Examiner* — Tarifur Chowdhury
*Assistant Examiner* — Sunghee Y Gray
(74) *Attorney, Agent, or Firm* — Oliff PLC

(57) ABSTRACT

A lens meter includes a measurement optical system having a light source, measurement target plate, and light receiving sensor. A lens table has an opening where a measurement optical axis of the measurement optical system passes. A frame support member includes a support plate that contacts a left rim and right rim of a spectacle frame. The support plate is moved toward the lens table by a guide mechanism. The frame support member further includes a cutout portion in the support plate that allow the lens, placed on the lens table, to measure a point near an edge of the lens located on the support plate side. A pad contacts and prevents the rim from entering the cutout portion. The pad is provided in at least a part of the cutout portion. A pad moving mechanism moves the pad from the contact surface.

13 Claims, 4 Drawing Sheets

LENS METER

CROSS-REFERENCE TO RELATED APPLICATIONS

This application is based upon and claims the benefit of priority from the prior Japanese Patent Application No. 2010-222134, filed on Sep. 30, 2010, the entire contents of which are incorporated herein by reference.

TECHNICAL FIELD

The present invention relates to a lens meter for measuring optical characteristics of a target lens to be measured.

BACKGROUND ART

There is known a lens meter to obtain optical characteristics of a lens by projecting a measurement light to the lens and receiving the light having passed through the lens by a light receiving element (see Patent Document 1, for example). When a spectacle or eyeglass lens set in a spectacle frame is to be measured by such a lens meter, an examiner first places (puts) the lens on a lens table which is a so-called nosepiece having a hole through which a measurement light axis of a measurement optical system and the measurement light pass. The examiner then brings a frame (a left rim and a right rim) in the case of a full rim frame and others or a lens (a left lens and a right lens) set in a frame in the case of a rimless frame and others into contact with a contact surface of a frame support member to restrict movement of the target lens. The frame support member is slidable (movable) in a direction to approach the lens table (i.e., a forward direction) and a direction to move away from the lens table (i.e., a backward direction). While keeping this state, the examiner moves the frame support member together with the frame and the lens to measure a predetermined portion (position or region) of the lens. By such measurement operations, as for even a progressive lens, the locations of a far vision zone and a near vision zone, and an additional power can be measured.

RELATED ART DOCUMENTS

Patent Documents

Patent Document 1: JP 2006-292650A

DISCLOSURE OF THE INVENTION

Problems to be Solved by the Invention

Recently, so-called half-eye frames having a narrow vertical width have appeared in the market. There are increasing cases where progressive lenses are also set in such frames (rims). When a progressive lens is framed in such a half-eye frame, a near vision zone is likely to be located close to an edge (a lower end) of a lower part (corresponding to a lower part of spectacles in a worn state) of the lens machined to meet the frame shape (a so-called lens shape). If the near vision zone located in the lower end of the lens is to be measured by the aforementioned lens meter, the frame support member is liable to contact (interfere) with the lens table and thus the frame support member (the frame and the lens) could not be moved any more in the forward direction.

As measures against the above problems, there is proposed a method of measuring a near vision zone in a lower end of a lens while a frame is placed apart from a frame support member. However, when the frame is apart from the frame support member, the frame could not be stably held. This case may cause such problems that the angle of a cylinder axis of the lens is measured with displacement, the length of a progressive zone (i.e., the distance from a far vision zone to a near vision zone) which would be determined based on a sliding (moving) amount of the frame support member could not be obtained, and others.

As another measure, there is a method of providing a hollow (a recess) in a portion of a frame support member that may contact (interfere) with a lens table in order to receive the lens table. However, if the frame gets caught in the hollow when the frame is brought into contact with the frame support member, the frame also could not be held stably.

The present invention has been made in view of the circumstances and has a purpose to provide a lens meter capable of accurately measuring even a near vision zone of a progressive lens set in a frame having a narrow vertical width.

Means of Solving the Problems

To achieve the above purpose, one aspect of the invention provides a lens meter for measuring optical characteristics of a spectacle lens, the lens meter comprising: a measurement optical system including a light source, a measurement target plate, and a light receiving sensor; a lens table to place a lens to be measured, the lens table having an opening through which a measurement optical axis of the measurement optical system passes; a frame support member including a frame support plate having a contact surface with which a left rim and a right rim of a spectacle frame will contact, the frame support plate being to be moved in a direction toward the lens table by a guide mechanism, this direction being referred to as a forward direction while an opposite direction is referred to as a backward direction, the frame support member including: a cutout portion provided in the frame support plate and configured to allow the lens table to come in backward than the contact surface of the frame support plate when the lens is placed on the lens table to measure a point close to an edge of the lens, the edge being located on the frame support plate side, while the rims of the spectacle frame are in contact with the frame support plate; a pad with which the rim will contact to prevent the rim from coming in the cutout portion, the pad being provided in at least a part of the cutout portion; and a pad moving mechanism to move the pad so that a surface of the pad is moved in the backward direction from the contact surface.

Effects of the Invention

According to the present invention, it is possible to accurately measure even a near vision zone of a progressive lens set in a frame having a narrow vertical width.

MODE FOR CARRYING OUT THE INVENTION

Figure 1:
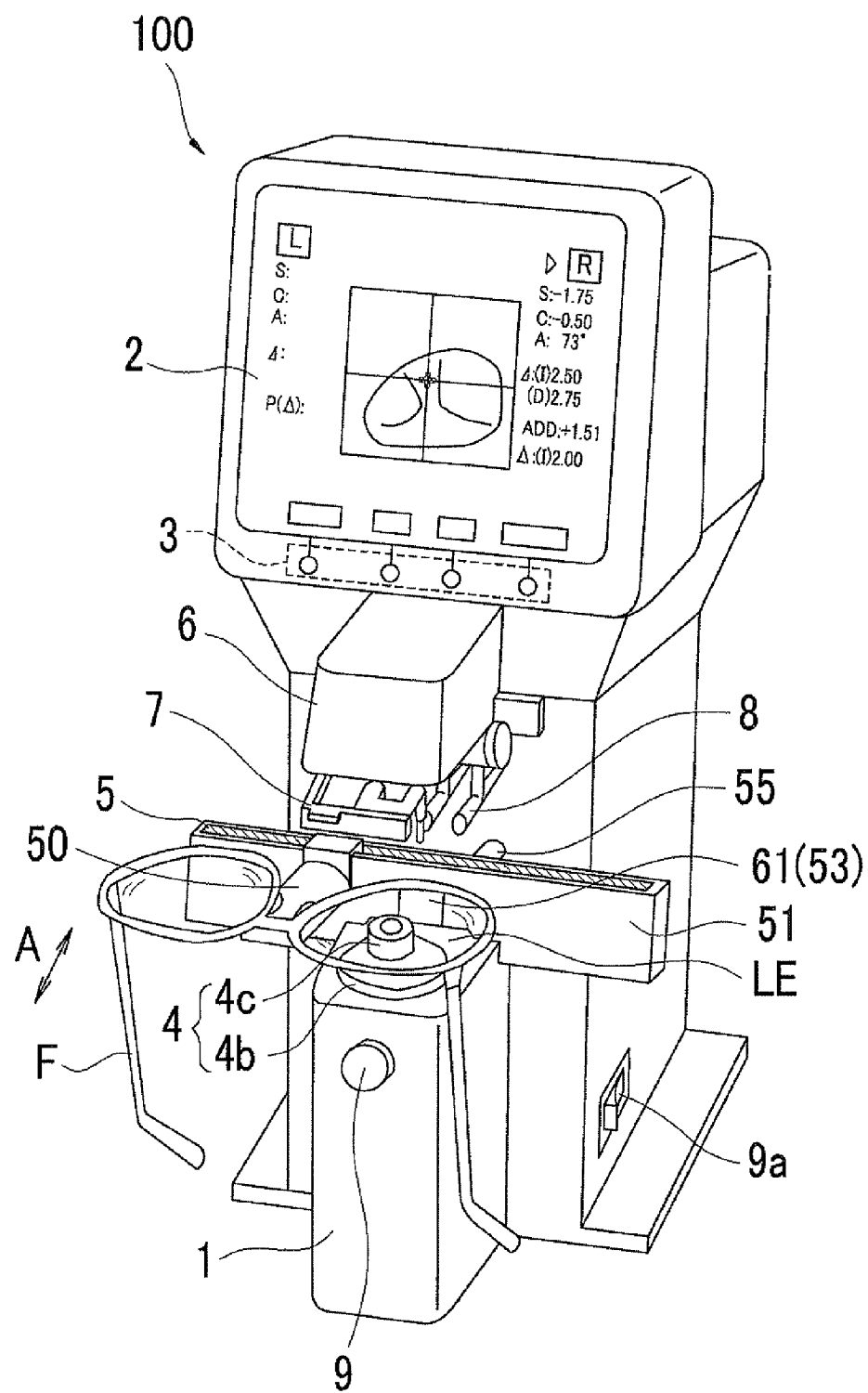
FIG. 1 is a schematic external view of a lens meter in an embodiment of the invention.

A detailed description of a preferred embodiment of the present invention will now be given referring to the accompanying drawings. FIG. 1 is a schematic external view of a lens meter of the present embodiment. A lens meter 100 includes a first housing part 1 containing a part of a measurement optical system 10 (see FIG. 2) (i.e., a light receiving optical system for measurement light in this embodiment) and including a lens table 4 placed on the housing part 1, a display 2 consisting of a liquid crystal display and others, a switch section 3 for input of operation signals and others, a frame support member 5, a second housing part 6 containing the other part of the measurement optical system 10 (a light projection optical system for measurement light in this embodiment) and including a lens retainer 7 and a marking unit 8 placed in a lower part of the second housing part 6, a READ switch 9 for data reading, a power switch 9a to turn on/off the power of the lens meter, and so on. To the contrary, the first housing part may contain the light projection optical system and the second housing part 6 may contain the light receiving optical system.

On the display 2, measurement information, alignment information, and others are displayed. The switch section 3 is arranged in correspondence with switch images appearing on the display 2 and operated to for example switch measurement modes.

Figure 2:
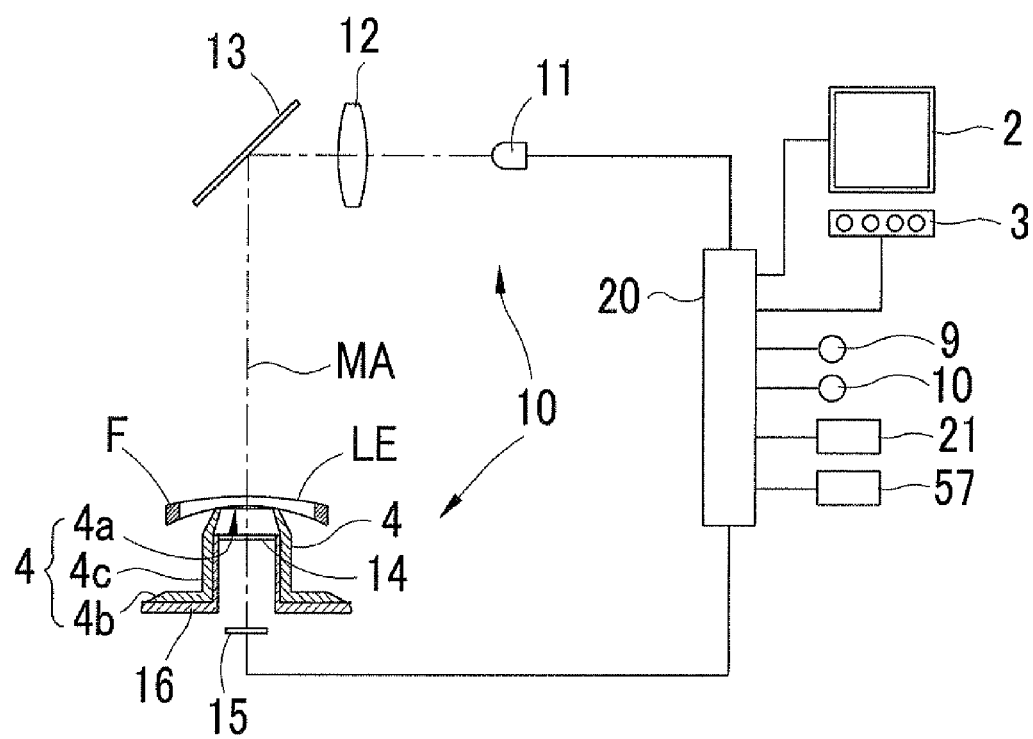
FIG. 2 is a schematic configuration view of an optical system and a control system of the lens meter.

The lens table 4 includes a cylindrical member 4c formed with an opening 4a which is a circular hole and a flange 4b formed to protrude radially outward from a lower end of the cylindrical member 4c (see FIG. 2). A measurement optical axis MA and measurement light of the measurement optical system 10 will pass through the opening 4a.

The frame support member 5 is placed to be slidable (movable) in a direction to approach the lens table 4 (i.e., a forward direction) and a direction to move apart from the lens table 4 (i.e., a backward direction), which are indicated by an arrow A in FIG. 1. In the measurement of a spectacle lens LE set in a spectacle frame F which is a full rim frame, a lower end of the frame F (a left rim and a right rim) is placed in contact with the frame support member 5. Thus, the frame F is stably held. In this embodiment, the "upper and lower" sides of the frame F and the lens LE correspond to the upper and lower sides of spectacles in a worn state. Accordingly, the frame F can be moved without causing displacement or deviation of the angle of cylinder axis of the lens LE and hence the angle of cylinder axis of the lens LE can be measured accurately. Similarly, in the case of the lens LE being a progress lens, its far vision zone and near vision zone can be measured accurately. In the measurement of the spectacle lens LE set in the rimless frame, the edge (the lower end) of the lens LE is brought into contact with the frame support member 5. The following explanation will be given to measurement of the lens LE set in the frame F which is a full rim frame.

The lens retainer 7 is located above the lens table 4 and is movable down to hold the lens LE on the lens table 4 stably. The marking unit 8 is located above the lens table 4 and is movable down to apply a mark (marking) onto the lens LE placed on the lens table 4.

At the press of the switch 9, a measured value is hold-displayed on the display 2 and stored in a memory 21 (see FIG. 2) in the lens meter.

FIG. 2 is a schematic configuration view of an optical system and a control system of the lens meter. Optical members are arranged on the measurement optical axis MA of the measurement optical system 10. Specifically, the measurement optical system 10 consists of a light projection optical system including a measurement light source 11 such as an emission diode, a collimator lens 12, a total-reflection mirror 13, and others, and a light receiving optical system including a target plate 14 formed with many measurement targets, a two-dimensional light receiving sensor (an image sensor) 15, and others. The target plate 14 is held in the hole (the opening 4a) of the lens table 4 by a target-plate holder 16 in a main body of the lens meter so that the opening 4a of the lens table 4 is located above the target plate 14. The opening 4a has a circular shape with a diameter of about 8 mm.

The target plate 14 is formed with a number of circular holes arranged in a lattice-like pattern, even though they are not illustrated in the figure. Those holes serve as measurement targets. Measurement light from the light source 11 is made into parallel light by the collimator lens 12 and then reflected by the mirror 13 to fall on the lens LE placed on the lens table 4. A part of the light passing through the lens LE passes through the opening 4a and the holes of the target plate 14 and then enters the light receiving sensor 15 (the light receiving sensor 15 receives images of the targets.

An output signal from the light receiving sensor 15 is input to an arithmetic control unit 20. The arithmetic control unit 20 assumes that a coordinate point of each target image received by the light receiving sensor 15 while a lens LE having a refractive power is not placed on the optical path of the measurement optical system 10 is a reference point and determines optical characteristics (spherical power S, cylinder power C, angle of cylinder axis A, and prism power A) of the lens LE based on a change of each target image received by the light receiving sensor 15 relative to the reference position while the lens LE is placed on the optical path of the measurement optical system 10. For the measurement of optical characteristics of the lens LE, a technique disclosed in JP 2006-292650A is available.

With such a measurement optical system, an optical characteristic distribution in a measurement region (a plurality of measurement points) of the lens LE corresponding to the opening 4a is obtained. Therefore, in the measurement of a progressive lens, it is possible to effectively detect which of the progressive zone, the far vision zone, and the near vision zone is present in the current measurement region. The arithmetic control unit 20 continuously obtains the optical characteristic distribution in a predetermined region at predetermined time intervals based on output signals from the light receiving sensor 15 and stores the distribution in the memory 21.

Figure 3:
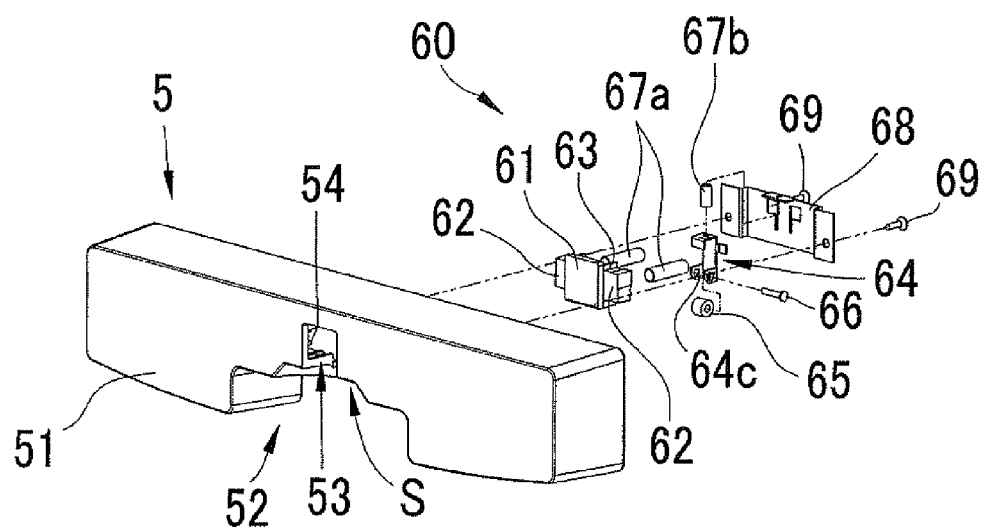
FIG. 3 is an exploded view of a frame support member.
Figure 4A:
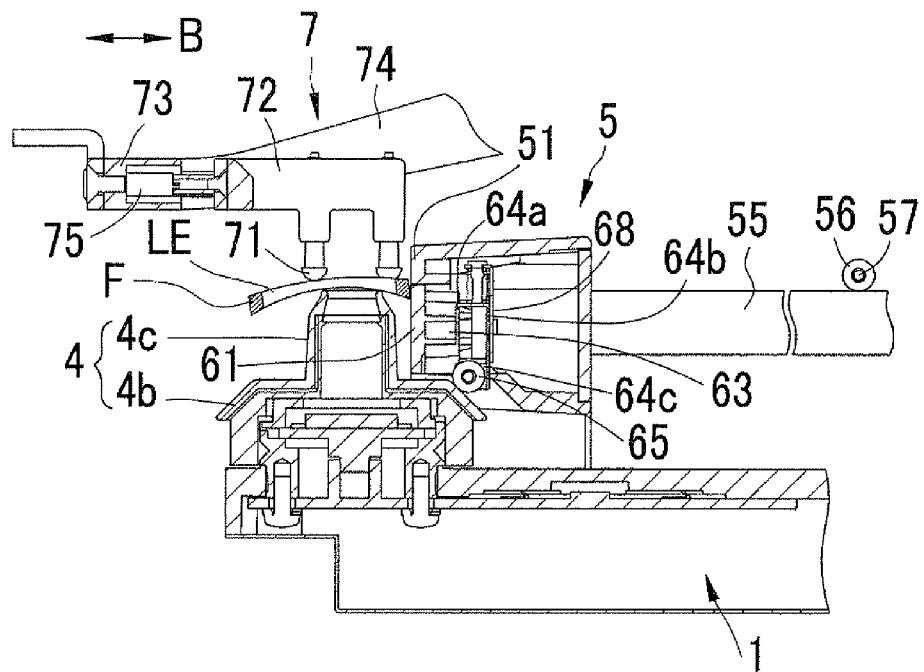
FIG. 4A is a sectional side view of a lens table, the frame support member, and a lens retainer, showing a state where movement of the pad is restricted.
Figure 4B:
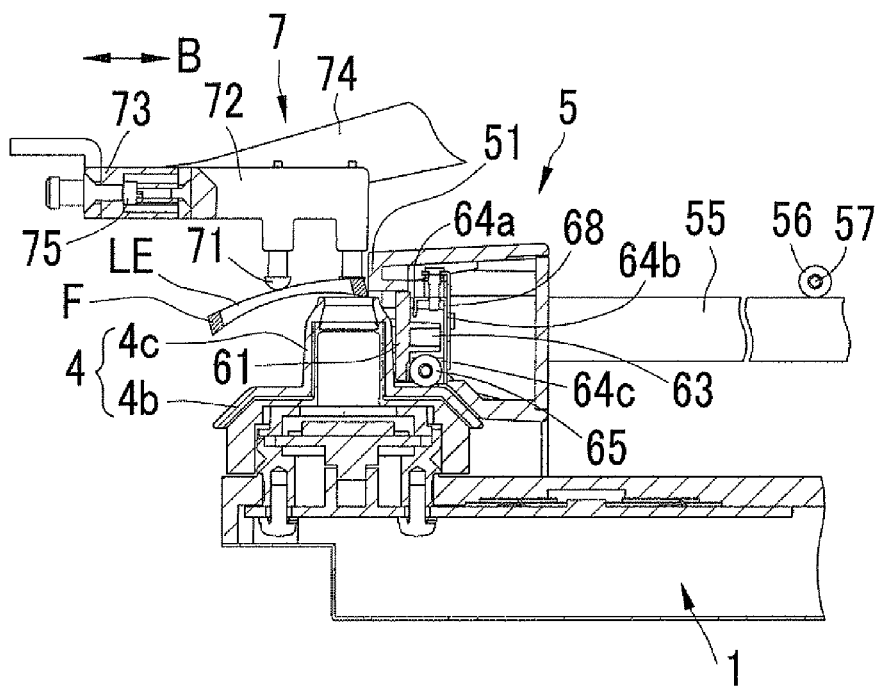
FIG. 4B is a sectional side view of the lens table, the frame support member, and the lens retainer, showing a state where the movement restriction of the pad is released.

An explanation will be given to the configurations of the frame support member 5 and the lens retainer 7. FIG. 3 is an exploded view of the frame support member 5. FIGS. 4A and 4B are sectional side views of the frame support member 5 and the lens retainer 7.

The frame support member 5 includes a contact part 51 which is a frame support plate having a front flat face on which the frame F will be abutted, a recess 52 which is a cutout portion formed in the contact part 51 to avoid interference with the first housing part 1, an opening 53 which is a cutout portion formed in the contact part 51 to receive (allow insertion of) the lens table 4 (the cylindrical member 4c) in the contact part 51 (more backward than the contact flat face which is the front surface of the contact part 51), stoppers 54 formed on both, right and left, sides of the opening 53 to restrain forward movement of the pad 61, a guide shaft 55 extending backward from the contact part 51 to guide movement of the contact part 51, and others.

The recess 52 is formed in a lower portion at the center of the contact part 51 in its width (lateral in FIG. 3) direction and has a lateral width equal to or slightly larger than a lateral width of an upper part of the first housing part 1. The opening 53 is formed at the center of the contact part 51 and in a position to receive or put in the lens table 4 when the contact part 51 is moved forward. In the contact part 51, a cutout upper end of the opening 53 is formed so as to be located above the upper end of the lens table 4 (the cylindrical member 4*c*) and at a distance of 1 mm or less from the upper end of the lens table 4 so that a contact surface on which the rim of the frame F can be abutted is also provided above the opening 53. Further, a cutout width of the opening 53 between both ends in its width direction may be determined to allow smooth insertion of the cylindrical member 4*c*. For instance, the cutout width of the opening 53 is determined to provide a distance of 1 mm or less apart from each of the left and the right end of the cylindrical member 4*c*. On the lower side of or under the opening 53, a space S serving as a cutout portion to receive the flange 4*b* is formed to be continuous with the recess 52. In other words, the opening 53 is formed on the upper side of and continuous with the space S. The guide shaft 55 extends along the moving direction (a back and forth direction) of the frame support member 5. The guide shaft 55 constitutes a guide mechanism to guide the movement of the contact part 51 in the back and forth direction and is held movably in the back and forth direction in a casing of the lens meter 100. The guide shaft 55 can be held by examiner's hand and will be moved back and forth by manual operations of the examiner.

The frame support member 5 further includes a nose-pad supporting member 50 on which nose pads of the frame F are supported. This supporting member 50 is held by the frame support member 5 so as to be movable in a right and left direction relative to the frame support member 5.

As above, the space S and the opening 53 which are the cutout portion are formed in the contact part 51 so that the lens table 4 enters more backward than the contact surface of the contact part 51 when the lens LE is set on the lens table 4 to measure a point close to the lens edge (located on the contact part 51 side) while the left and right rims of the frame F are in contact with the contact part 51. However, if the opening 53 remains open when the point close to the lens edge is not measured (i.e., when the center of a single focus lens is measured or when a far vision zone of a progressive lens is measured), a rim located lower than the upper end of the lens table 4 may go into the opening 53, resulting in a state where the left rim and the right rim of the frame F are not positioned in the same plane. To prevent such a defect, the frame support member 5 includes a pad unit 60 including a pad 61 which will contact with a rim to prevent the rim from going into the opening 53.

The pad unit 60 in this embodiment includes a pad moving mechanism for allowing movement of the pad 61 in a direction to engage in the opening 53 (a forward direction) and a direction to separate from the opening 53 (a backward direction). The pad moving mechanism includes a restriction mechanism for restricting movement of the pad 61 in the direction to separate from the opening 53, a release mechanism for releasing the restriction of movement of the pad 61 set by the restriction mechanism in the direction to separate from the opening 53.

The pad unit 60 includes the pad 61 having a front surface forming a part of the front surface of the contact part 51 (i.e., a front surface to be flush with the front surface of the contact part 51) while the pad 61 engages in the opening 53, protrusions 62 extending respectively from right and left side ends of the pad 61 to prevent any further forward movement of the pad 61 by coming into contact with the stoppers 54, a member 63 extending backward from a back surface of the pad 61, a restriction member 64 movable in an up and down direction (in an almost vertical direction), a roller 65 which is a rotary member rotatably held at a lower portion of the restriction member 64, a pin 66 securing the roller 65 to the restriction member 64, a spring 67*a* which is an urging member to urge the pad 61 forward, a spring 67*b* urging the restriction member 64 downward, a back plate 68 to hold the pad 61, restriction member 64, springs 67*a* and 67*b*, and others from behind and fix the pad 60 to the frame support member 5 (the contact part 51), and screws 69 to fix the back plate 68 to the frame support member 5 (the contact part 51), and so on. Although the protrusions 62 in the present embodiment are provided on both right and left sides of the pad 61, at least a single protrusion has only to be provided on either right or left side. The protrusions 62 may be provided on an upper side of the pad 61 instead of on both right and left sides or on either right or left side. The position(s) of the stopper(s) 54 may be determined according to the position(s) of the protrusion(s) 62.

The pad 61 is formed in a flat plate-like shape to prevent displacement of the frame F when the frame F comes into contact with the pad 61. The protrusions 62 are designed so as to abut on the stoppers 54 so that the pad 61 (the front surface thereof) does not protrude from the front surface of the contact part 51 even when the pad 61 is urged forward by the spring 67*a*. In other words, the stoppers 54 and the protrusions 62 serve to make the front surface of the contact part 51 and the front surface of the pad 61 flush with each other. The member 63 is located at the center of the back surface of the pad 61 and has a length enough to come into contact with a front plate portion 64*a* of the restriction member 64 when the front surface of the pad 61 becomes substantially flush with the front surface of the contact part 51. The restriction member 64 includes the front plate portion 64*a*, a back plate portion 64*b* whose upper portion is continuous with the front plate portion 64*a*, a roller holding portion 64*c* to which the roller 65 is fixed with the pin 66, and others. The front plate portion 64*a* serves to disallow (restrict) backward movement of the pad 61 when the front plate portion 64*a* is in contact with the member 63. When the front plate portion 64*a* is moved upward (the details will be mentioned later), coming out of the back side of the member 63, the member 63 (the pad 61) is enabled to move backward. The member 63 is thus moved backward until it comes into contact with the back plate portion 64*b*. Accordingly, the distance at which the member 63 moves backward until comes into contact with the back plate portion 64*b* corresponds to the distance at which the pad 61 separates from the opening 63 and moves backward. The roller 65 is rotatably held by the roller holding part 64*c*. Two springs 67*a* are arranged right and left (in a lateral direction) with respect to the pad 61. One ends of the springs 67*a* are fixed to the pad 61, while the other ends are fixed to (held by) the back plate 68. A single spring 67*b* is placed vertically in the restriction member 64. One end of the spring 67*b* is fixed to the restriction member 64 while the other end is fixed to the back plate 68. The back plate 68 is formed with guide grooves extending in an up and down direction to guide the restriction member 64 in the up and down direction, fixing portions for the springs 67*a* and 67*b*, holes for insertion of the screws 69, and others.

The frame support member 5 is mounted on the first housing part 1 so as to be slid (moved) back and forth (in a direction indicated by a double-headed arrow B in FIGS. 4A and 4B). In a back portion of the guide shaft 55, a roller 56 which is in contact with the guide shaft 55 and an encoder 57 for detecting a rotation amount of the roller 56. The guide shaft 55 is formed with a rack and the roller 56 is formed with a pinion engageable with the rack. As the guide shaft 55 is moved back and forth, the roller 56 is rotated. Accordingly, the guide shaft 55 is moved in association with movement of the frame support member 5 (the contact part 51). A movement amount of the guide shaft 55 (the rotation amount of the roller 56) is detected by the encoder 57 and a detection signal representing the movement amount is transmitted to the arithmetic control unit 20. Accordingly, the position (a movement amount) of the frame support member is determined by the arithmetic control unit 20. The positional information (movement information) of the frame support member 5 is used for measurement of the distance from a far vision zone to a near vision zone of a progressive lens, and the like. The position (the movement amount) of the guide shaft 55 may be detected by a known mechanism.

The restriction mechanism includes, as mentioned above, the member 63, the restriction member 64, the spring 67b, the back plate 68, the screws 69, and others. The release mechanism has a restriction member moving mechanism for moving the restriction member 64 to a first position in which the restriction member 64 comes into contact with the back portion (the member 63) of the pad 61 and a second position in which the restriction member 64 comes out of the back portion of the pad 61. This restriction member moving mechanism includes the spring 67b, the roller 65, and others in this embodiment in addition to the back plate 68 for holding the restriction member 64 movably up and down, and others. The pad moving mechanism includes the springs 67a and also includes the stoppers 54 and the protrusion 62 constituting a stopper mechanism to restrict movement of the pad 61 to prevent the surface of the pad 61 from moving forward than the contact surface.

The lens retainer (a lens retainer member) 7 includes at least three pads (only two of them are illustrated in FIGS. 4A and 4B) 71 to be brought into contact with the surface of the lens LE, a pad holder 72 for holding the pads 71, a lens retainer support member 73 for supporting the pad holder 72 movably in a back and forth direction (in the direction indicated by the double-headed arrow B in FIGS. 4A and 4B), an arm 74 connected to the lens retainer support member 73 and fixed to a lower part of the second housing part 6, a spring 75 arranged in the lens retainer support member 73 to urge the pad holder 72 backward, a stopper for restricting backward movement of the pad holder 72 so that the pad holder 72 urged backward by the spring 75 is held in a predetermined state (i.e., in a state where the pads 71 are arranged around the measurement optical axis MA), and others. The spring 75 has an urging force enough to enable the pads 71 to keep the lens LE held and also to enable the pads 71 (the pad holder 72) to move forward as the frame support member 5 (the contact part 51) moves forward.

The following explanation will be given to upward and downward movement of the restriction member 64 and restriction of backward movement of the pad 61 and release of that restriction. FIG. 4A shows a restriction state where backward movement of the pad 61 is restricted and FIG. 4B shows a release state where the restriction of backward movement of the pad 61 is released.

As shown in FIG. 4A, when the frame support member 5 is placed on the first housing part 1, the roller 65 is located in the space S. Accordingly, the restriction member 64 is located in a lower position and the back side of the member 63 is in contact with the front plate portion 64a. In this state, the member 63 is not permitted to move backward, thereby restricting backward movement of the pad 61.

As the frame support member 5 is moved forward from the state shown in FIG. 4A, the lens table 4 comes into contact with the pad 61 (this state is not illustrated). At that time, the flange 4b enters in the space S and the roller 65 runs up on the flange 4b. When the roller 65 moves upward, the restriction member 64 (the front plate portion 64a) also moves upward. Thus, the front plate portion 64a comes out of the back side of the member 63. This releases the restriction of backward movement of the pad 61. The pad 61 is thus pushed by the lens table 4 to move backward. At that time, the pads 71 and the pad holder 72 of the lens retainer 7 are moved forward as the frame support member 5 is moved forward. The pads 71 continue to hold the lens LE from above.

When the frame support member 5 is moved further forward, as shown in FIG. 4B, the member 63 comes into contact with the back plate portion 64b and is stopped from further backward movement. Accordingly, the pad 61 is not allowed to move any more backward in the opening 53. When the pad 61 comes to the state shown in FIG. 4B as above, the lens table 4 is received in the opening 53.

The restriction member 64 is moved in the up and down direction in the above manner to perform restriction of backward movement of the pad 61 and release of the restriction of backward movement of the pad 61. In other words, the pad unit 60 provides the aforementioned movement mechanism, restriction mechanism, and release mechanism.

The backward moving distance (a movable range) of the pad 61 is determined by the distance between the front plate portion 64a and the back plat portion 64b in the back and forth direction. Specifically, the backward moving distance of the pad 61 corresponds to the length (depth) of the space for receiving the lens table 4 in the depth direction. In the present embodiment, this length is determined to allow the frame support member 5 (the contact part 51) to cover the opening 4a slightly (about 1 mm). The contact surface of the contact part 51 (the frame support plate) to be moved forward has only to be made movable until it reaches the opening 4a of the lens table 4. Accordingly, as shown in FIG. 4B, while the rim of the spectacle flame is in contact with the contact part 51 located above the opening 53, measurement of a near vision point close to an edge (located on the contact part 51 side) of a progressive lens is enabled.

The position at which the restriction of backward movement of the pad 61 is released is determined based on the size of the flange 4b (the outward protruding length thereof) and the position of the roller 65. In the present embodiment, the restriction of backward movement of the pad 61 is released just before the front surface of the contact part 51 (the pad 61) comes into contact with the lens table 4 (the cylindrical member 4c). Specifically, the size of the flange 4b and the position of the roller 65 are determined so that the roller 65 starts to run up onto the flange 4b just before the front surface of the contact part 51 (the pad 61) comes into contact with the lens table 4 (the cylindrical member 4c).

The lens meter configured as above will be explained below with a focus on measurement operations of a progressive lens. The following explanation is given under the condition that the frame F (the rim) is a narrow frame with a small width in a vertical direction and a near vision zone of the progressive lens LE is located near the edge (the lower end) of a lower part of the lens LE, i.e., the near vision zone is located near the lower part of the frame F.

The examiner operates a switch arranged in the switch section 3 to select a progressive lens measurement mode. The examiner then puts (places) the lens LE set in the frame F onto the lens table 4 and brings the lower portions of the right and left rims of the frame F into contact with the front surface of the frame support member 5 (the contact part 51). Over the opening 4a, a portion of the lens LE, considered as a far vision zone, is placed. The examiner moves the frame support member 5 toward his/her side (toward the lens table 4 side) while holding the frame F and the frame support member 5 with his/her hands. As the lens LE is moved on the lens table 4, the optical characteristics of the lens LE (the spherical power S (or spherical equivalent power S), cylinder power C, cylinder axis angle A, and prism power Δ) are sequentially measured. In the progressive lens measurement mode, a mark having a progressive zone graphic simulating a progressive lens, a mark representing a current measurement region, and so on. The examiner performs measurement while aligning a desired portion of the lens LE to the measurement optical system 10 (the measurement optical axis MA) by referring to those marks.

The progressive lens measurement is conducted by first specifying the location of the far vision zone and measuring the power of the far vision zone, and then specifying the location of the near vision zone and measuring the power of the near vision zone, and finally obtaining the additional power based on the power of the far vision zone and the power of the near vision zone.

To be concrete, after the optical characteristics of the far vision zone of the lens LE are measured and stored in the memory 21, a measurement step of the near vision zone of the lens LE follows. The examiner moves the frame F and the lens LE as well as the frame support member 5 toward his/her side to bring the near vision zone into a measurement region. As the lower end portion of the lens LE approaches the opening 4a, the frame support member 5 contacts (interferes) with the lens table 4. At that time, the pad 61 contacting with the lens table 4 is released from the restriction of backward movement, thereby allowing the lens table 4 to come into the frame support member 5 (the opening 53) in association with (in synchronization with) forward movement of the frame support member 5. Accordingly, the near vision zone located near the lower end of the lens LE can be measured.

When the optical characteristics of the near vision zone of the lens LE are measured, the arithmetic control unit 20 determines the additive power based on the power of the far vision zone and the power of the near vision zone. Further, this control unit 20 also determines the distance from the far vision zone to the near vision zone based on a signal from the encoder 57. Those measurement and arithmetic results are stored in the memory 21 and further displayed on the display 2.

As above, the near vision zone (the optical characteristics thereof) of the progressive lens set in the frame with a narrow vertical width can be accurately measured. To be concrete, the lower end portion of the lens LE can be positioned over the opening 4a, thereby enabling measurement of the near vision zone. Further, not only the far vision zone measurement but also the near vision zone measurement can be performed without separating the frame F from the frame support member 5. This makes it possible to measure the location of the near vision zone and the length of the progressive zone (the distance from the far vision zone to the near vision zone).

Since there are provided the restriction mechanism to restrict backward movement of the pad 61 and the release mechanism to release the restriction, the front surface of the frame support member 5 (the contact part 51) is almost flush (flat) while the frame F (the left rim and the right rim) is in contact with the frame support member 5. Thus, the frame F is not displaced or deviated. Only during measurement of the lens meter LE with its near vision zone being located near the lower end portion of the lens LE, the pad 61 is moved backward when contacting with the lens table 4, thereby enabling the measurement of the near vision zone. When a center portion of a single focus lens is to be measured or when a far vision area of a progressive lens is to be measured, the contact part 51 is apart from the lens table 4 (the cylindrical member 4c). In this case, the surface of the pad 61 is positioned to close the opening 53. This prevents the rim of the lens LE placed on the lens table 4 from coming into the opening 53 which is the cutout portion. Accordingly, the left rim and the right rim of the frame F are brought into contact with the flush surface of the contact part 51. The cylinder axis angle of the lens LE placed on the lens table 4 can be measured accurately. Further, as needed, the near vision zone of the progressive lens LE set in the frame F (the rim) having a small vertical width can be measured. The above restriction of movement of the pad 61 and release of the restriction are carried out in association with movement of the frame support member 5. The examiner does not need to make release operations and others. Thus, the lens LE can be measured efficiently.

In the above configuration, the member 63 is provided on the back surface of the pad 61. Not only that, another configuration may be adopted in which the member 63 is not provided and the front plate portion 64a of the restriction member 64 is formed to extend up to the back surface of the pad 61. In this case, when the restriction member 64 is moved upward until the front plate portion 64a comes outside the back surface of the pad 61, the restriction is released.

In the above configuration, the springs 67a are used to urge the pad 61, but the springs 67a are not indispensable. It is only necessary to provide for example a mechanism to move the pad 61 in the back and forth direction in association with the back and forth movement of the frame support member 5.

In the above configuration, the mechanism (the detection mechanism and the release mechanism) of releasing the restriction of backward movement of the pad 61 is operated by detecting the sliding (moving) position of the frame support member 5 when the roller 65 runs up over the flange 4b, but the invention is not limited thereto. The detection mechanism and the release mechanism may be configured not only as a mechanical structure but also a structure to detect the position of the frame support member 5 by a sensor and release the restriction based on the detection result (an output signal from the sensor). For instance, the detection mechanism and the release mechanism may be arranged to detect the position of the frame support member 5 (the contact part 51, the guide shaft 55, etc.) by a positional sensor such as a potentiometer. Alternatively, an optical sensor, a magnetic sensor, or other sensors may be adopted for the above detection. The detection mechanism detects that the contact part 51 has been moved to a predetermined position (e.g., a position in which or just before the surface of the contact part 51 contacts with the cylindrical member 4c of the lens table 4). An alternative may be configured such that a drive source such as a motor, a solenoid, etc. is used as the release mechanism to move the restriction member 64, the drive source is driven based on a detection result of the detection mechanism, and the restriction member 64 is moved from a contact position with the back portion of the pad 61 to a non-contact position. In this case, the pad 61 is urged forward by the springs 67a and the surface of the pad 61 is stopped by a stopper mechanism (the stoppers 54 and the protrusions 62) against forward movement than the contact surface of the contact part 51.

Another alternative may be configured such that the springs 67a and the restriction member 64 are omitted and the pad moving mechanism including the restriction mechanism and the release mechanism is constituted of a motor, a slide mechanism, and others. In this configuration, driving of the motor is controlled by the arithmetic control unit 20 based on the detection result of the detection mechanism and the pad 61 is moved backward by driving of the motor.

The above release mechanism is adapted to release the restriction of backward movement of the pad 61 in association with the movement of the frame support member 5, but is not limited thereto. This mechanism may be configured to release the restriction by manual operations of an examiner. For instance, it may be arranged to release the restriction of backward movement of the pad 61 by manipulation of a lever coupled to the restriction member 64 by an examiner to thereby move the restriction member 64 upward.

DESCRIPTION OF THE REFERENCE SIGNS

4 Lens table
5 Frame support member
7 Lens retainer
10 Optical system
20 Arithmetic control unit
51 Contact part
53 Opening
60 Pad unit
61 Pad
63 Member
64 Restriction member
65 Roller
100 Lens meter

The invention claimed is:

1. A lens meter for measuring optical characteristics of a spectacle lens, the lens meter comprising:
  a measurement optical system including a light source, a measurement target plate, and a light receiving sensor;
  a lens table to place a lens to be measured, the lens table having an opening through which a measurement optical axis of the measurement optical system passes;
  a frame support member including a frame support plate having a contact surface with which a left rim and a right rim of a spectacle frame will contact, the frame support plate being movable in a direction toward the lens table by a guide mechanism, this direction being referred to as a forward direction while an opposite direction is referred to as a backward direction,
  the frame support member including:
    a cutout portion provided in the frame support plate and configured to allow a contact portion of the lens table contacting with the lens to move in the backward direction past the contact surface of the frame support plate when the lens is placed on the lens table to measure a point close to an edge of the lens, the edge being located on the frame support plate side, while the rims of the spectacle frame are in contact with the frame support plate;
    a pad with which the rim will contact to prevent the rim from coming in the cutout portion, the pad being provided in at least a part of the cutout portion; and
    a pad moving mechanism to move the pad so that a surface of the pad is moved in the backward direction from the contact surface.

2. The lens meter according to claim 1, wherein the pad moving mechanism includes a restriction mechanism to restrict movement of the pad in the backward direction to prevent the surface of the pad from moving backward from the contact surface and a release mechanism to release restriction imposed by the restriction mechanism.

3. The lens meter according to claim 2, wherein the pad moving mechanism includes a stopper mechanism to restrict movement of the pad to prevent the surface of the pad from moving in the forward direction past the contact surface and an urging member to urge the pad in the forward direction,
  the restriction mechanism includes a restriction member configured to contact with a back portion of the pad to restrict movement of the pad in the backward direction past a stop position restricted by the restriction mechanism, and
  the release mechanism includes a restriction member moving mechanism to move the restriction member to a first position in which the restriction member will contact with the back portion of the pad and a second position in which the restriction member is out of the back portion of the pad.

4. The lens meter according to claim 3, wherein the release mechanism moves the restriction member from the first position to the second position when the frame support plate reaches a predetermined position in synchronization with movement of the frame support plate in the forward direction.

5. The lens meter according to claim 4, wherein the predetermined position is a position in which or just before the pad contacts with the lens table.

6. The lens meter according to claim 3, wherein the release mechanism includes an operation member to be operated by an operator to move the restriction member.

7. The lens meter according to claim 3, wherein the release mechanism includes a sensor to detect that the frame support plate reaches a predetermined position in association with movement of the frame support plate in the forward direction and a drive source to move the restriction member from the first position to the second position based on a detection result of the sensor.

8. The lens meter according to claim 3, wherein the lens table includes a cylindrical member having an opening through which measurement light will passes and a flange formed at a lower end of the cylindrical member,
  the release mechanism includes a holding mechanism to hold the restriction member so that the restriction member is movable from the first position to the second position and a roller placed at a lower end of the restriction member, and
  when the pad comes into contact with the cylindrical member in association with movement of the frame support plate in the forward direction, the roller runs up on the flange, moving the restriction member from the first position to the second position, releasing the restriction of movement of the pad.

9. The lens meter according to claim 3, wherein the release mechanism acts when the pad comes into contact with the lens table by movement of the frame support plate in the forward direction, and the pad is pushed by the lens table to move backward from the contact surface of the frame support plate by further movement of the frame support plate in the forward direction.

10. The lens meter according to claim 2 further including a detection mechanism to detect a moving position of the frame support plate,
  wherein the pad moving mechanism includes a stopper mechanism to stop the pad to prevent the surface of the pad from moving in the forward direction past the contact surface and an urging member to urge the pad in the forward direction, and
  the release mechanism acts based on a detection result of the detection mechanism.

11. The lens meter according to claim 1 further including a detection mechanism to detect a moving position of the frame support plate, wherein the pad moving mechanism includes a motor to move the pad based on a detection result of the detection mechanism.

12. The lens meter according to claim 1, wherein the lens table includes a cylindrical member having an opening through which measurement light will passes and a flange formed at a lower end of the cylindrical member, the cutout portion includes a first cutout portion in which the flange will move backward past the contact surface of the frame support plate and a second cutout portion to allow the cylindrical member to move backward past the contact surface of the frame support plate, the second cutout portion being formed continuous with and on the first cutout portion, the second cutout portion is formed in the frame support plate above an upper end of the cylindrical member and at a distance of 1 mm or less from the upper end of the cylindrical member, and the pad is provided in at least a part of the cutout portion.

13. The lens meter according to claim 1 further including a lens retainer to retain the spectacle lens put on the lens table from a lens surface direction, the lens retainer being held to be movable in the forward direction and the backward direction.

\* \* \* \* \*